United States Patent Office 3,236,785
Patented Feb. 22, 1966

3,236,785
POLYMERIZATION OF EPOXIDES USING A PYROPHOSPHORIC ACID-METAL HALIDE REACTION PRODUCT AS CATALYST
Paul A. Naro, Woodbury, and Robert D. Offenhauer, Sewell, N.J., assignors to Socony Mobil Oil Company, Inc., a corporation of New York
No Drawing. Filed Sept. 21, 1962, Ser. No. 225,387
6 Claims. (Cl. 260—2)

This invention relates to a process for the catalytic polymerization of epoxide compounds. More particularly, this invention relates to the process for polymerizing vicinal epoxide compounds in the presence of a catalytic amount of the neutralized reaction product of pyrophosphoric acid and Group IIIb metal halides hereinafter described, to produce solid polymers.

The polymerization of vicinal epoxide compounds is known in the art wherein various polymerization catalyst systems are utilized. The difficulty which arises in the epoxide polymerization process relates to the selectivity of the types of catalysts which are used. Many known polymerization catalysts will not effectively polymerize vicinal epoxide compounds, in particular propylene oxide, to solid polymers. For example, boron trifluoride will not effectively polymerize propylene oxide to a solid polymer but will readily polymerize other vicinal epoxide compounds such as ethylene oxide, isobutylene oxide, among others, to form solid polymers. Propylene oxide, on the other hand, is known to polymerize rapidly in the presnce of alkalies and acids and even explosively with a Friedel-Crafts catalyst such as stannic chloride, but the products are generally viscous liquids of a low degree of polymerization. There are, however, various catalysts such as ferric hydroxide, stannous organic acid salts, among others, which are known to polymerize vicinal epoxide compounds including propylene oxide to solid polymers. It is the principal object of this invention to provide an additional and novel process for the catalytic polymerization of vicinal epoxide compounds, including propylene oxide, to form solid polymeric materials utilizing catalytic quantities of the neutralized reaction product of pyrophosphoric acid and Group IIIb metal halides.

Accordingly, a process for the catalytic polymerization of aliphatic vicinal epoxide compounds containing from 2 to 18 carbon atoms to form solid homopolymers or solid copolymers thereof has been discovered which comprises contacting said vicinal epoxide compounds with a neutralized reaction product of pyrophosphoric acid and Group IIIb metal halides. The reaction temperatures for the polymerization are maintained in the range from about 20° C. to about 150° C. for a sufficient period of time to polymerize the vicinal epoxide compound. It should be noted at this time that the expression "vicinal epoxide compound" as used herein including the appended claims, refers to those organic compounds containing a single epoxy group wherein the oxygen atom is bonded to vicinal carbon atoms, i.e.,

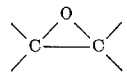

and the remaining portion of the compound is free from unsaturation other than aromatic unsaturation.

The vicinal epoxide compounds which can be polymerized to solid homopolymers in the process of this invention can be characterized by the following structure:

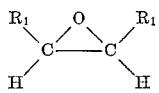

wherein each $R_1$, individually, can represent hydrogen or an aliphatic hydrocarbon radical. Illustrative $R_1$ hydrocarbon radicals include methyl, ethyl, propyl, butyl, isobutyl, hexyl, heptyl, nonyl, dodecyl, octadecyl, and the like. The preferred epoxide compounds to be employed are the lower aliphatic epoxide compounds containing no more than 6 carbon atoms while the more preferred compounds include ethylene oxide and propylene oxide.

In addition to the production of the homopolymers described above, copolymers of the various epoxide compounds, heretofore described, can be produced by the process of this invention. It is preferred, however, in the production of copolymers to utilize the lower aliphatic epoxide compounds or admixture thereof and more preferably ethylene oxide and propylene oxide, in amounts up to about equal proportions by weight of said epoxide compounds.

The catalyst which is used in the process of the invention is the neutralized reaction product of pyrophosphoric acid and a Group IIIb metal halide. The Group IIIb metals used are those of the Periodic Table which includes boron, aluminum, gallium, indium and thallium while the halide includes chlorine, iodine, bromine and fluorine. The preferred catalyst is the neutralized reaction product of pyrophosphoric acid and aluminum chloride hexahydrate.

The catalyst used in the process of the invention can be prepared by the reaction of pyrophosphoric acid and the Group IIIb halide on a mole to mole basis or using a molar excess of halide in the presence of water and the reaction product is neutralized with an appropriate base to a pH in the range from about 5 to about 7. Although any base can be utilized to neutralize the catalyst reaction product, it is highly desirable to use small quantities of base in the neutralizing step to avoid localized areas of extremely basic conditions which may seriously damage the catalytic activity of the desired product. For this reason, it is preferred to utilize a basic material such as ethylene oxide which is not strongly basic and can prevent extreme localized basic conditions yet provide the neutralized effect desired. After neutralization, the water and ethylene chlorohydrin can be removed by solvent extraction utilizing an organic solvent such as propanol-2. The resulting product can then be dried and used as the catalytic polymerization agent or can be further treated to improve its catalytic activity by the method of calcining in an atmosphere of air, nitrogen, carbon dioxide and the like at temperatures in the range from about 100° C. to about 600° C. for a period of time ranging from about 1 hour to 150 hours, or longer, if desired.

The resulting catalyst composition comprising the neutralized reaction product of pyrophosphoric acid is not specifically known. It would appear that the catalyst product produced by the reaction of phosphoric acid and aluminum chloride would be aluminum pyrophosphate; however, the reaction of sodium pyrophosphate with aluminum chloride does produce aluminum pyrophosphate which has substantially no catalytic activity for the polymerization of vicinal epoxide compounds. Therefore, if aluminum pyrophosphate is the final catalyst product of the reaction of pyrophosphoric acid and aluminum chloride, it is not in the form of aluminum pyrophosphate as produced by the reaction of sodium pyrophosphate and aluminum chloride.

The catalyst concentration used in accordance with the method of this invention can be varied over a broad range and can be selected on the basis of the rate of polymerization desired and the polymerization temperature to be used. It has been found that catalyst concentrations from about 0.005, or lower, to about 15 weight percent, or higher, preferably from about 0.1 to about 5 weight percent based on the weight of the vicinal epoxide compound used, may be employed.

The temperature employed in the polymerization may vary over a considerable range depending upon the vicinal epoxide and catalyst being employed. In most cases, the temperature will vary from about 20° C. to about 150° C. Preferred temperatures range from about 70° C. to about 120° C. The period of time required for the polymerization reaction can range from several hours to as long as 30 days or longer, depending on the concentration of the catalyst, temperature, the particular catalyst employed, the epoxide compound to be polymerized and other factors. Atmospheric, superatmospheric, or subatmospheric pressures may be utilized.

In the process of this invention, the polymerization may be carried out in solution and bulk systems. If solvents are employed, they can be solvents for the monomers and polymer or they can be solvents for the monomers and nonsolvents for the polymers. Examples of solvents useful in a solution polymerization include acetone, diethyl ether, ethanol, ethylacetate, acetophenone, carbon tetrachloride, benzene, n-hexane, petroleum ether, diisopropyl ether, and the like.

After the polymerization reaction is complete, the unreacted materials can be separated from the vicinal epoxide polymer by any suitable method such as solvent extraction, precipitation, distillation, filtration, and the like. The polymer product can then be worked up in any suitable manner.

The polymeric materials that can be obtained by the practice of the invention are solid substances that have at least one and usually more of a variety of uses including the preparation of molds, films, fibers, coating applications, among others.

The following examples will serve to illustrate the process of the invention without limiting the same:

*Example 1*

Pyrophosphoric acid (55.2 grams, 0.31 mole) was added in one portion to a rapidly stirred solution of 100 grams (0.41 mole) of aluminum chloride hexahydrate in 150 milliliters of water. The solution was stirred for 20 minutes at about 50° C. (self-generated heat), cooled to 0° C. and treated with 125 milliliters of ethylene oxide. The mixture quickly set to a stiff gel. The gel was warmed to room temperature, broken up and thoroughly extracted with propanol-2. The product was dried in a rotary evaporator at 100° C. and 200 millimeters pressure until it became a free flowing powder.

The resulting product was activated in two ways:

*Method A.*—This method comprises heating the material at 100° C. and 1.0 millimeter pressure for 16 hours.

*Method B.*—This method consists in heating the material at 600° C. for 96 hours with an air purge. The product is finely ground and further heated at 100° C. for 16 hours at 1.0 millimeters pressure.

*Example 2*

A magnetically stirred glass pressure reactor was charged with 100 grams freshly distilled and dried propylene oxide and 2.0 grams of the catalyst of Example 1, Method A. The reactor was placed in an oil bath maintained at 100° C. and stirred for one hour, then removed and stirred at room temperature for 16 hours. The reactor was replaced in the 100° C. bath and stirred for 96 hours, then removed, cooled and opened. The grey, sticky polymer (60.8 grams) was removed, and a 5.2 grams sample was dissolved in benzene, centrifuged and freeze dried. After the white, fluffy product was heated 16 hours at 60° C. and 1.0 millimeter pressure, it had an intrinsic viscosity of 4.2 (measured in benzene at 30° C.) with an estimated molecular weight of 394,000 and weighed 3.8 grams. The total conversion for the reaction was 44%, based on propylene oxide.

*Example 3*

A magnetically stirred, glass pressure reactor was charged with 100 grams of freshly distilled and dried propylene oxide and 2.0 grams of the catalyst of Example 1, Method B. The reactor was placed in an oil bath maintained at 100° C. and stirred magnetically for 70 hours. The crude product was purified and dried as in Example 2, yielding 31% of white polypropylene oxide having an intrinsic viscosity of 5.0 (measured in benzene at 30° C.) and an estimated molecular weight of 491,000.

It has been shown by the present inventors in copending U.S. patent application, Serial Number 164,391, filed January 4, 1962, that aluminum phosphate having a surface area in excess of about 75 square meters per gram provided a satisfactory solid propylene oxide polymer. The following example demonstrates the polymerization results of the aluminum phosphate catalyst.

*Example 4*

A magnetically stirred, glass pressure reactor was charged with 100 grams of freshly distilled and dried propylene oxide, 400 grams of anhydrous benzene and 2 grams of aluminum phosphate having a surface area of 424 square meters per gram. The reactor was placed in an oil bath maintained at 100° C. and stirred for 48 hours, then removed, cooled and opened. The polymer product is separated from the unreacted propylene oxide benzene solution and catalyst by centrifuging and freeze drying. After the white fluffy product was heated for 16 hours at 60° and 1 millimeter pressure, it had an intrinsic viscosity of 2.9 (measured in benzene at 30° C.) with an estimated molecular weight of 248,000. The total conversion for the reaction was 41% based on propylene oxide.

Comparing the propylene oxide polymer obtained using aluminum phosphate as the catalyst with the polymer obtained using the neutralized reaction product of pyrophosphoric acid and aluminum chloride (as described in Examples 2 and 3 above) it should be readily apparent that the molecular weight which is the desirable physical property of a polymer is considerably lower for the aluminum phosphate catalyst than the molecular weight of the polymer produced in Examples 2 and 3. The polymerized propylene oxide obtained using the neutralized reaction product of pyrophosphoric acid and aluminum chloride is superior to that of the propylene oxide polymer of aluminum phosphate.

*Example 5*

A magnetically stirred, glass pressure reactor was charged with 100 cubic centimeters of ethylene oxide and 1.0 gram of the aluminum pyrophosphate of Example 1, Method A. The reaction mixture was stirred at room temperature for 2 hours and then at 100° C. for 5 hours. The reactor was then removed from the bath and stirred at room temperature for 50 hours, opened and the very hard, horny material was removed. The polymer was purified as in Examples 2 and 3, yielding 28 grams of the purified product, intrinsic viscosity 3.8 (measured in benzene or acetonitrile at 30° C.).

*Example 6*

Aluminum pyrophosphate was prepared by charging 32.1 grams of aluminum chloride hexahydrate (0.133 mole) and 200 milliliters of distilled water to a stirred reactor. A warm solution of 44.6 grams of tetrasodium pyrophosphate decahydrate (0.1 mole) in 200 milliliters of distilled water was added rapidly. The white precipitate was filtered and washed with water, thoroughly extracted with isopropyl alcohol, and dried to obtain a free flowing powder. After calcining for 48 hours at 550° C. to 600° C., the material was contacted with propylene oxide under the conditions as described in Example 2. No polymerization occured indicating that the aluminum pyrophosphate prepared in this manner is completely inactive as a polymerization catalyst.

It will be understood that the above description is merely illustrative of preferred embodiments of the invention of which many variations may be made within the scape of the following claims by those skilled in the art without departing from the spirit thereof.

What is claimed is:

1. A process which comprises polymerizing a vicinal monoepoxide compound containing from 2 to 18 carbon atoms and free from ethylenic and acetylenic unsaturation in the presence of about 0.005 to about 15 weight percent, based on the weight of the monoexpoxide compound, of the solid reaction product of pyrophosphoric acid and a metal halide wherein the metal portion of said metal halide is selected from the group consisting of boron, aluminum, gallium, indium and thallium, the reaction product being prepared by reacting pyrophosphoric acid with at least about a molar equivalent of the metal halide, neutralizing to a pH between about 5 and about 7, and drying and calcining to produce a catalytically active product; at a polymerization temperature from about 20° C. to about 150° C. for a period of time sufficient to produce a solid polymer.

2. A process according to claim 1 wherein the metal is aluminum.

3. A process which comprises polymerizing a vicinal monoepoxide compound containing from 2 to 18 carbon atoms and free from ethylenic and acetylenic unsaturation in the present of about 0.005 to about 15 weight percent, based on the weight of the monoepoxide compound, of the solid reaction product of pyrophosphoric acid and aluminum chloride hexahydrate, the reaction product being prepared by reacting pyrophosphoric acid with at least about a molar equivalent of aluminum chloride hexahydrate, neturalizing to pH between about 5 and 7, and drying and calcining to produce a catalytically active product; at a polymerization temperature from about 20° C. to about 150° C.; for a period of time sufficient to produce a solid polymer.

4. A process which comprises polymerizing a vicinal monoepoxide compound containing from 2 to 18 carbon atoms and free from ethylenic and acetylenic unsaturation in the presence of about 0.1 to about 5.0 weight percent, based on the weight of the monoepoxide compound, of the solid reaction product of pyrophosphoric acid and an aluminum halide, the reaction product being prepared by reacting pyrophosphoric acid with at least about a molar equivalent of the aluminum halide, neutralizing to a pH between about 5 and about 7, and drying and calcining to produce a catalytically active product; at a polymerization temperature from about 70° C. to about 120° C.; for a period of time sufficient to produce a solid polymer.

5. A process according to claim 4 wherein said vicinal monoepoxide compound is ethylene oxide.

6. A process according to claim 4 wherein said vicinal monoepoxide compound is propylene oxide.

References Cited by the Examiner
UNITED STATES PATENTS

| | | | |
|---|---|---|---|
| 1,921,378 | 8/1933 | Webel | 260—2 XR |
| 2,706,182 | 4/1955 | Pruitt et al. | 260—2 |
| 2,739,972 | 3/1956 | Abbott et al | 260—2 |
| 3,018,258 | 1/1962 | Meier et al. | 260—2 |

FOREIGN PATENTS

| | | |
|---|---|---|
| 594,025 | 3/1960 | Canada. |

OTHER REFERENCES

Lee et al., "Epoxy Resins," McGraw-Hill, New York, 1957, page 147.

WILLIAM H. SHORT, *Primary Examiner.*